(12) United States Patent
Carelli

(10) Patent No.: US 7,765,735 B1
(45) Date of Patent: Aug. 3, 2010

(54) METHOD OF TREATING MULCH

(76) Inventor: Samuel P. Carelli, 1828 Shore Rd., Linwood, NJ (US) 08221-2235

(*) Notice: Subject to any disclaimer, the term of this patent is extended or adjusted under 35 U.S.C. 154(b) by 60 days.

(21) Appl. No.: 12/277,489

(22) Filed: Nov. 25, 2008

Related U.S. Application Data

(60) Provisional application No. 61/190,644, filed on Sep. 2, 2008.

(51) Int. Cl.
*A01G 7/00* (2006.01)
(52) U.S. Cl. .......................................................... 47/9
(58) Field of Classification Search ................ 47/9, 47/1.5
See application file for complete search history.

(56) References Cited

U.S. PATENT DOCUMENTS

| | | | | |
|---|---|---|---|---|
| 454,117 | A * | 6/1891 | Myers ........................ | 47/1.5 |
| 2,789,396 | A * | 4/1957 | Jernander et al. .......... | 47/1.5 |
| 3,184,888 | A * | 5/1965 | Fruth et al. ................ | 47/1.5 |
| 3,475,435 | A * | 10/1969 | Rothfelder ................. | 111/186 |
| 4,144,673 | A * | 3/1979 | Quast et al. ................ | 47/57.5 |
| 4,357,779 | A * | 11/1982 | Maddock ................... | 47/1.5 |
| 4,705,816 | A * | 11/1987 | Pole et al. ................. | 523/132 |
| 4,896,457 | A * | 1/1990 | Pitcher ...................... | 47/82 |
| 4,932,156 | A | 6/1990 | Underwood | |
| 5,143,289 | A * | 9/1992 | Gresham et al. ........... | 239/7 |
| 5,585,150 | A | 12/1996 | Sheehan | |
| 6,252,129 | B1 * | 6/2001 | Coffee ....................... | 602/42 |
| 6,301,829 | B1 | 10/2001 | Kaufmann | |
| 2006/0178272 | A1 | 8/2006 | Buono et al. | |
| 2007/0000167 | A1 * | 1/2007 | Buono et al. .............. | 47/9 |
| 2007/0119334 | A1 | 5/2007 | Atkinson | |
| 2008/0153703 | A1 * | 6/2008 | Kubota et al. ............. | 504/125 |

* cited by examiner

*Primary Examiner*—Francis T Palo
(74) *Attorney, Agent, or Firm*—Sturm & Fix LLP

(57) ABSTRACT

The present invention provides a method of treating a mulch bed by applying an adhesive composition using portable apparatus including a disposable translucent container supported by a shoulder strap and connected to a wand distributor. The container is filled with liquid adhesive composition having a consistency similar to milk. A wand distributor is attached to the container port and includes a rigid conduit stem interconnecting the container port and a distribution head. The shoulder strap is positioned on the shoulder of a user to support and transport the container. The user operates a gravity flow valve and grasps the rigid stem to move the distributor head and apply the adhesive composition to an area of a mulch bed to prevent undesirable movement of the mulch material.

13 Claims, 3 Drawing Sheets

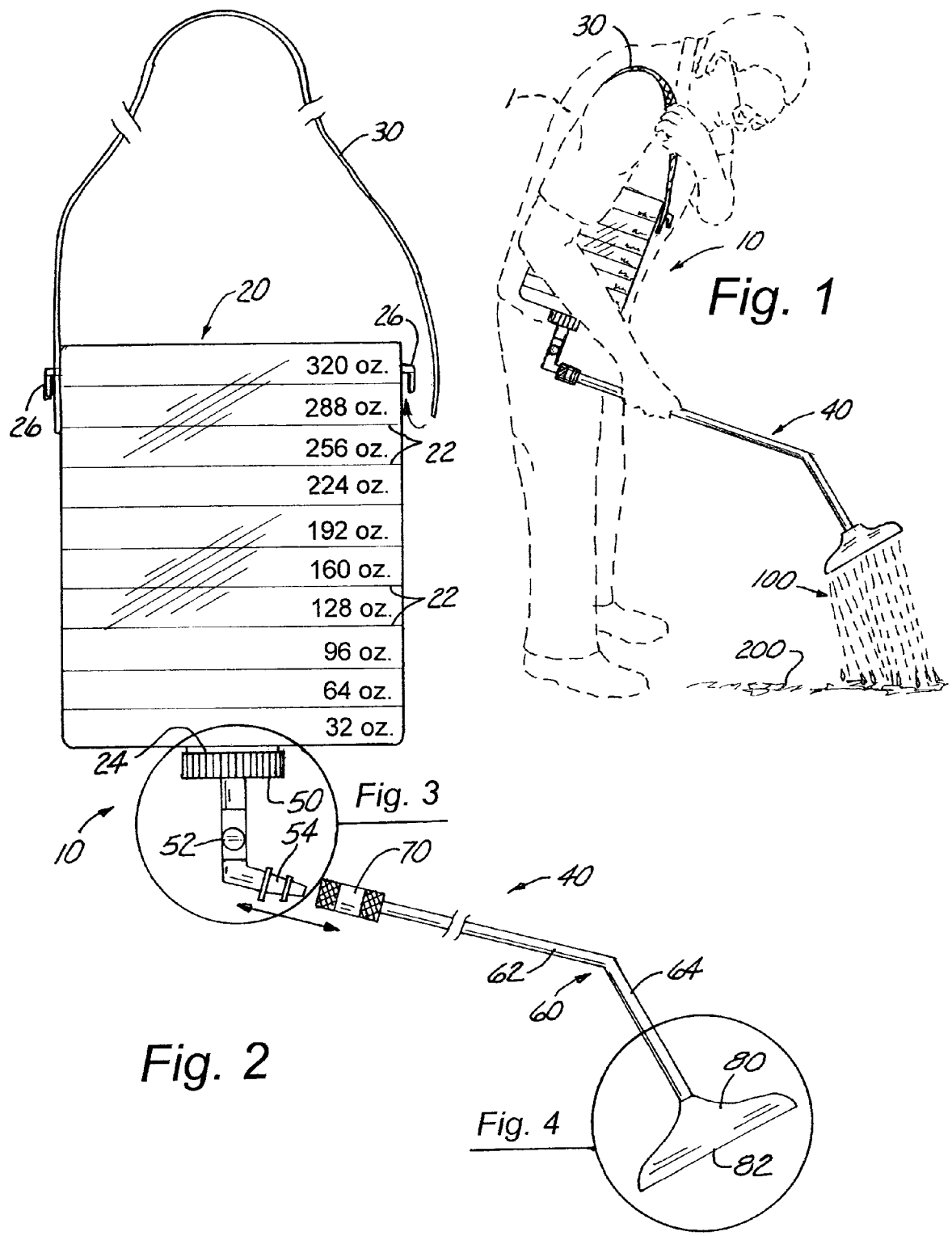

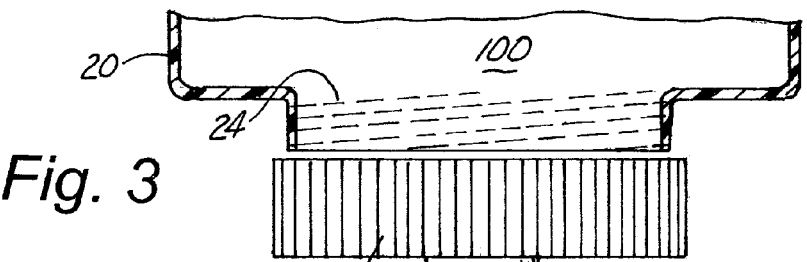
Fig. 3
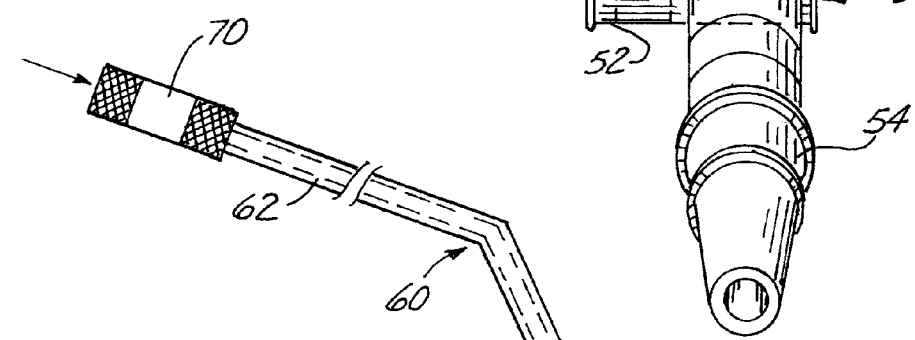
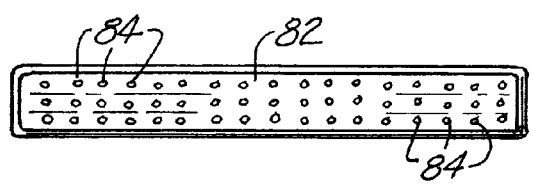
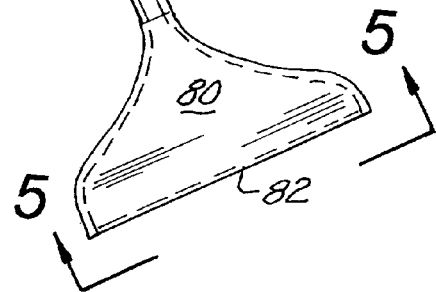
Fig. 4
Fig. 5

METHOD OF TREATING MULCH

CROSS-REFERENCE TO RELATED APPLICATIONS

This application claims the benefit of U.S. Provisional Patent Application Ser. No. 61/190,644, filed Sep. 2, 2008 entitled "Mulch tech: a system of application and adheason for the semi-permanent anchoring of mulch with additives to prevent smoldering and weed control" which is incorporated by reference herein in its entirety.

BACKGROUND OF THE INVENTION

1. Field of the Invention

The present invention relates to the field of landscaping techniques, and more particularly to a method of treating a mulch bed to prevent undesirable movement.

2. Description of Related Art

As can be seen by reference to the following U.S. Pat. Nos. 4,932,156; 5,585,150; 6,301,829; U.S. Publn. Nos. 20060178272; 20070000167; and 20070119334, the prior at is replete with myriad and diverse mulch treatments.

While all of the aforementioned prior art methods are adequate for the basic purpose and function for which they have been specifically designed, they are uniformly deficient with respect to their failure to provide a simple, efficient, and practical method of preventing the undesirable movement of a mulch bed.

As a consequence of the foregoing situation, there has existed a longstanding need for a new and improved method of treating a mulch body, and the provision of such a method is a stated objective of the present invention.

BRIEF SUMMARY OF THE INVENTION

Briefly stated, the present invention provides a method of treating a mulch bedyy by applying an adhesive composition using portable apparatus including a disposable translucent container supported by a shoulder strap and connected to a wand distributor. The container is filled with liquid adhesive composition having a consistency similar to milk. A wand distributor is attached to the container port and includes a rigid conduit stem interconnecting the container port and a distribution head. The shoulder strap is positioned on the shoulder of a user to support and transport the container. The user operates a gravity flow valve and grasps the rigid stem to move the distributor head and apply the adhesive composition to an area of a mulch bed to prevent undesirable movement of the mulch material.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view showing an individual using an apparatus to apply an adhesive composition to a mulch bed to prevent undesirable movement;

FIG. 2 is a side elevational view showing the apparatus used in the mulch treatment method, wherein the container is made of a rigid plastic material;

FIG. 3 is an enlarged partial perspective view showing the rigid container port with a flow control valve and a quick connect coupling;

FIG. 4 is a side elevational of the wand distributor;

FIG. 5 is a sectional view taken along line 5-5 of FIG. 4, showing the enlarged discharge end of the distributor head;

DETAILED DESCRIPTION OF THE INVENTION

Figures 6, 7:
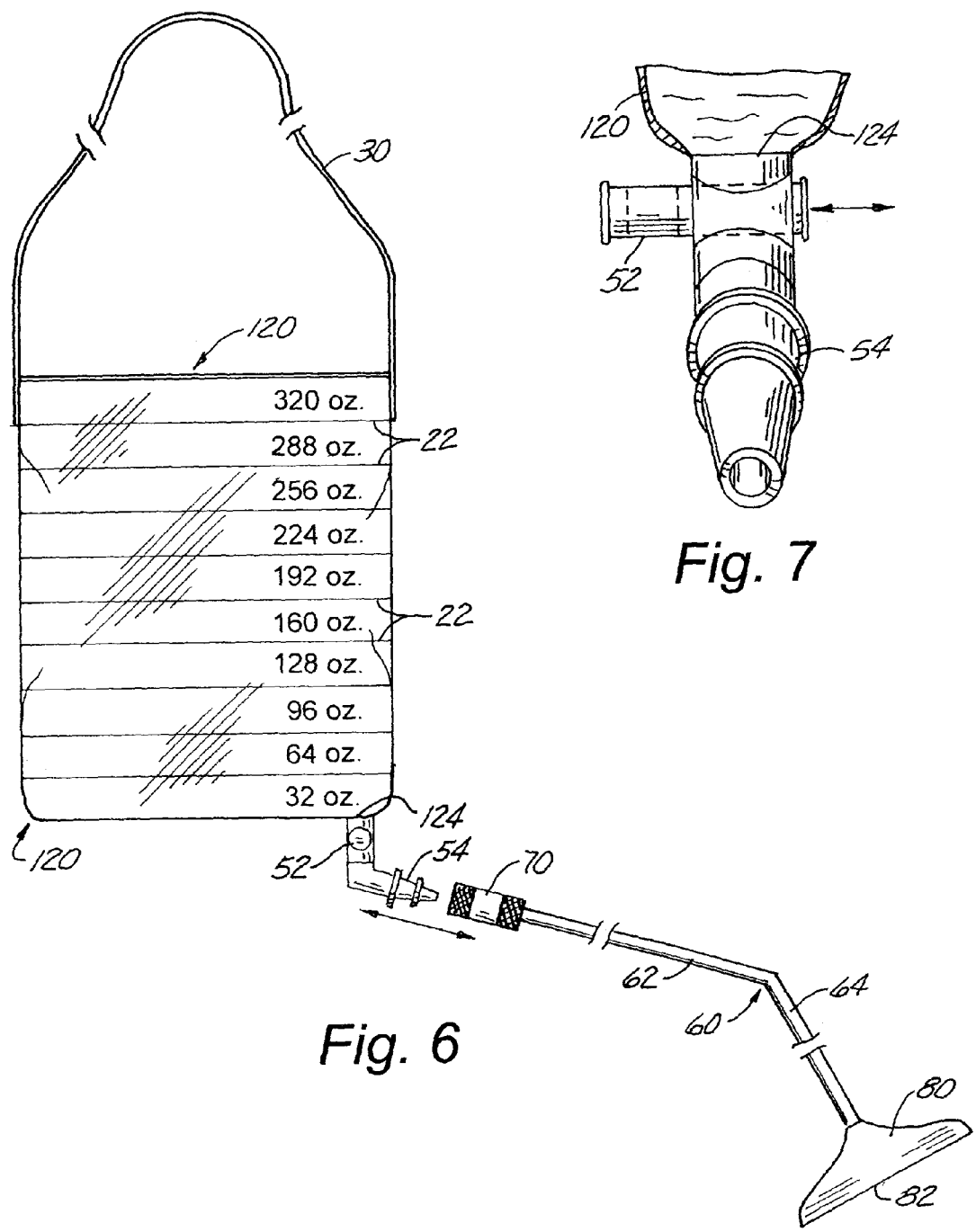
FIG. 6 is a side elevational view showing an alternate apparatus used in the method, wherein the container is made of flexible plastic material.
FIG. 7 is an enlarged partial perspective view showing the flexible container port with a flow control valve and a quick connect coupling.

As can be seen by reference to the drawings, and in particular to FIG. 1, the apparatus used in the mulch treatment method that forms the basis of the present invention is designated generally by the reference number 10. The apparatus 10 includes a disposable translucent container 20 formed of a rigid plastic material similar to that used for milk containers. The sidewall of the container 20 carries a series of spaced markings 22 at one quart intervals that indicate the volume in the container 20 below the markings 22. A port 24 is formed in the bottom and of the container 20 and is used to fill a liquid adhesive composition 100 into the container, and to discharge the composition 100 by gravity from the container 20. Tabs 26 are carried on opposite sides of the container 20 near the top end for attachment of a shoulder strap 30.

Although the preferred embodiment of the apparatus 10 includes the rigid container 20, it is to be understood that a container 120 formed of flexible plastic material, illustrated in FIGS. 6 and 7, could also be used. Further, a larger five gallon container could be provided for commercial users where the container could be carried on the back with straps for both shoulders.

FIGS. 2 and 3 show a wand distributor 40 attached to the port 24 of container 20 by securing a threaded cap 50 to a threaded portion of the port 24. A fitting including a sliding spool gravity flow control valve 52 and a coupling end 54 extends down from the cap 50. A rigid conduit stem 60 having a linear upper section 62 and a downwardly angled lower section 64 is attached by a quick connect coupling 70 to the end 54. A distribution head 80 is attached at the end of the lower section 64 and has an elongated rectangular discharge end 82 with a plurality of spaced discharge openings 84 (FIG. 5.)

FIGS. 6 and 7 show a wand distributor 40 attached to the port 124 of flexible container 120. The fitting with the valve 52 and coupling end 54 is heat sealed to the flexible container port 120.

The method of the present invention includes the treatment of a mulch bed 200 by applying a liquid adhesive composition 100 using the portable apparatus 10. The container 20 is filled with the adhesive composition 100 and the wand distributor 40 is attached to the container port 24. The shoulder strap 30 is placed on the shoulder of the user 1 to support and transport the container 20. The flow control valve 52 is opened and the stem 60 is moved to apply the adhesive compound 100 to an area of the mulch bed 200 to hold the mulch bed 200 in place and prevent undesirable movement.

The preferred liquid adhesive composition 100 is a liquid having consistency similar to milk. The adhesive composition 100 is made up of 30-40 weight percent vinyl acetate polymers, less than 2 weight percent vinyl acetate monomers, 60-70 weight percent water, less than 2 weight percent toluene, and less than 0.005 weight percent biocide.

The adhesive composition 100 is applied to existing mulch covering 200 producing a bonding of the mulch material, with the effect of giving the treated area the ability to withstand outside forces, which can lead to the breakdown and separation of the untreated mulch. This specially formulated adhesive 100 is particularly useful on the perimeter of landscaped areas, where mulch is in close proximity, or in contact with any hard surface such as curbs, sidewalks, parking areas, streets, and hardscaped displays. A heavy rain or a drainage area is particularly harmful to untreated mulch cover. Generally, the mulch will break apart, and in the case of flowing water, will wash away. Another adverse effect is that some types of mulch will bleed on a porous surface and leave an unsightly stain.

During lawn work, debris such as lawn clippings, twigs, leaves, etc., generally end up on the mulch bed 200. The accepted method for cleanup is to use a leaf blower to remove foreign matter from mulch covering causing the mulch to be blown about. The present invention will prevent this from being a factor so that the leaf blower does a great job of removing only the debris without disturbing the treated mulch bed 200.

The adhesive bond is strong enough to withstand the occasional person walking on the surface. The adhesive composition 100 is environmentally safe and has been formulated to dry quickly even when applied to damp material. Drying time is generally 2 to 3 hours in 60 degree temperature. A full cure occurs in 5 to 7 hours with direct sunlight lowering both times. When cured, it is completely waterproof and holds up under a direct stream from a garden hose. The treated mulch does not experience a significant change in its original properties. The formula allows the mulch to retain its color, enhance the mulch's ability to retard weed growth, and prevent a burning object from penetrating the hard surface making a smoldering fire more difficult to start. Also, weed control, and fire retarding additives may be added to the adhesive composition 100. A very important benefit of the system is that is extends the useful life of the mulch cover greatly. With a dusting of new material and a treatment, the original mulch can last for many seasons. The cost of upkeep is lowered substantially. The delivery apparatus is designed to allow even and controlled distribution of adhesive composition 100. A simplified proportion system, plus a special gravity flow wand distributor 40 is used to distribute the adhesive composition 100 in a very controlled manner. The delivery system 10 is user friendly and it is very inexpensive to reproduce.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A method of preventing the movement of a mulch bed from a placement area, the method comprising the steps of:
   providing a disposable translucent container having a top end and a bottom end, a port located at the bottom end, and a shoulder strap having opposing ends attached adjacent the top end in spaced relationship;
   filling a liquid adhesive composition into the container through the port;
   attaching a wand distributor to the container port, the wand distributor including a rigid conduit stem having a top end operatively attached to the container port and a bottom end attached to a distribution head, and a flow control valve disposed to control the gravity flow of the adhesive composition through the conduit;
   placing the shoulder strap on a shoulder of a user to support and transport the container;
   opening the flow control valve to allow the adhesive composition to flow by gravity from the container; and
   grasping the stem and moving the distribution head to apply the adhesive composition to an area of the mulch bed, whereby undesirable movement of mulch material from the mulch bed is prevented.

2. The method of claim 1, wherein the container is formed of a rigid plastic.

3. The method of claim 1 wherein the container is formed of a flexible plastic.

4. The method of claim 1, wherein the container carries a series of spaced markings indicating the volumes of adhesive composition in the container below the markings.

5. The method of claim 4, wherein the markings are at one quart intervals.

6. The method of claim 1, wherein the adhesive composition comprises 30-40 weight percent of vinyl acetate polymers, and 10-70 weight percent water.

7. The method of claim 6, wherein the adhesive composition further includes less than 2 weight percent vinyl acetate monomers, less than 2 weight percent toluene, and less than 0.005 weight percent biocide.

8. The method of claim 1, wherein the conduit stem includes an elongated linear upper section operably attached to the container port, and a downwardly angled lower section operably attached to the distribution head.

9. The method of claim 8, wherein the flow control valve is disposed between the container port and the conduit stem.

10. The method of claim 9, wherein the distribution head includes an enlarged discharge end having an elongated rectangular cross section, and a plurality of spaced discharge openings.

11. The method of claim 10, wherein the flow control valve is a sliding spool valve.

12. The method of claim 10, wherein the conduit stem is operably attached to the container port with a quick connect coupling.

13. The method of claim 1, further including the steps of:
   disconnecting the wand distributor from an empty container; and
   disposing of the empty container.

\* \* \* \* \*